(12) United States Patent
Suzuki

(10) Patent No.: US 7,864,348 B2
(45) Date of Patent: Jan. 4, 2011

(54) PRINTING APPARATUS PRINTING BASED ON A DEGREE OF URGENCY

(75) Inventor: Masakazu Suzuki, Nara (JP)

(73) Assignee: Sharp Kabushiki Kaisha, Osaka-Shi (JP)

(*) Notice: Subject to any disclaimer, the term of this patent is extended or adjusted under 35 U.S.C. 154(b) by 1063 days.

(21) Appl. No.: 11/444,458

(22) Filed: Jun. 1, 2006

(65) Prior Publication Data

US 2006/0274348 A1   Dec. 7, 2006

(30) Foreign Application Priority Data

Jun. 3, 2005   (JP) .............................. 2005-164347

(51) Int. Cl.
G06F 15/00 (2006.01)
G06F 3/12 (2006.01)
G06K 1/00 (2006.01)

(52) U.S. Cl. .................................... 358/1.13; 358/1.15

(58) Field of Classification Search ............... 358/1.13, 358/1.14; 713/300, 310, 320, 323; 712/43, 712/229; 700/40, 101, 102; 710/10, 14; 707/7; 718/103; 711/151
See application file for complete search history.

(56) References Cited

U.S. PATENT DOCUMENTS 6,813,037 B1 * 11/2004 Collard .................... 358/1.15

2004/0105111 A1 * 6/2004 Guddanti .................. 358/1.13

FOREIGN PATENT DOCUMENTS

| JP | 08286846 A | * | 11/1996 |
| JP | 10-233907 A | | 9/1998 |
| JP | 2000-272203 A | | 10/2000 |
| JP | 2001-287425 A | | 10/2001 |
| JP | 2003-84935 A | | 3/2003 |

* cited by examiner

Primary Examiner—Douglas Q Tran
(74) Attorney, Agent, or Firm—Birch, Stewart, Kolasch & Birch, LLP

(57) ABSTRACT

A printing apparatus having a standby mode and an energy saving mode, the standby mode being capable of receiving data to be printed and of starting printing processing for the received data without requiring warming-up and the energy saving mode being capable of receiving the data and of starting the printing processing after warming-up, the printing apparatus including: a print data receiving section for receiving print data from outside as the data to be printed, the print data being provided with a degree of urgency; a printing control section for changing modes between the standby mode and the energy saving mode for receiving the data and for performing control of the printing processing for the received data; and a printing section; wherein, upon the reception of the print data in the energy saving mode, the printing control section changes the mode to the standby mode for starting the printing processing or keeps the energy saving mode for suspending the printing processing based on the degree of urgency provided with the received print data.

9 Claims, 8 Drawing Sheets

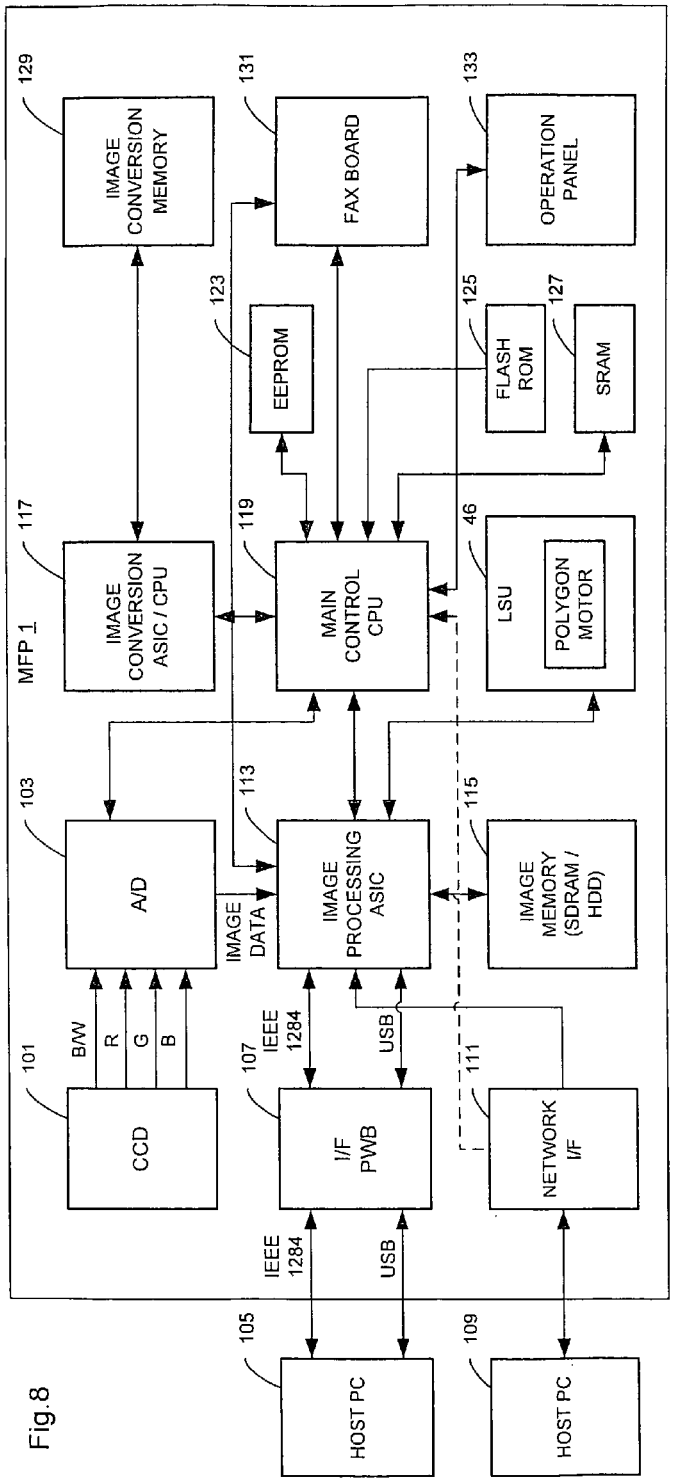

Fig.8

| | |
|---|---|
| CCD: | IMAGE INPUTTING PHOTOELECTRIC TRANSDUCER |
| A/D: | A/D CONVERTER |
| IMAGE PROCESSING ASIC: | IMAGE PROCESSING OPERATION CHIP DEDICATED FOR IMAGE PROCESSING |
| IMAGE MEMORY: | MEMORY FOR STORING INPUT IMAGE DATA |
| IMAGE CONVERSION ASIC/CPU: | OPERATION CHIP FOR CONVERTING INPUT IMAGE |
| | CPU FOR CONTROLLING VARIOUS TYPES OF DEVICES |
| LSU (POLYGON MOTOR): | LASER SCANNING UNIT |
| EEPROM: | NONVOLATILE MEMORY CAPABLE OF STORING DATA SUCH AS SETTINGS OF THE APPARATUS MAIN BODY, |
| | EVEN AFTER POWER-OFF |
| FLASH ROM: | IT STORES A PROGRAMS FOR CONTROLLING THE MFP. THE CPU EXTRACTS DATA THEREFROM TO PERFORM CONTROLS |
| SRAM: | WORK MEMORY FOR CONTROLLING THE OPERATION OF THE MAIN CONTROL CPU |
| IMAGE CONVERSION MEMORY: | WORK AREA FOR USE FOR CONVERSION (ROTATION AND THE LIKE) OF INPUT IMAGES |
| FAX BOARD: | FAX MODEM BOARD FOR CONTROLLING FAX COMMUNICATION AND TRANSMITTED/RECEIVED DATA |
| OPERATION PANEL: | MFP OPERATION PANEL SECTION INCLUDING VARIOUS TYPES OF BUTTONS AND AN LCD SCREEN AND THE LIKE |

PRINTING APPARATUS PRINTING BASED ON A DEGREE OF URGENCY

CROSS-REFERENCE TO RELATED APPLICATION

This application is related to Japanese Patent Application No. 2005-164347 filed on Jun. 3, 2005, whose priority is claimed and the disclosure of which is incorporated by reference in its entirety.

BACKGROUND OF THE INVENTION

1. Field of the Invention

The present invention relates to a printing apparatus having a standby mode and an energy saving mode or a multi-function peripheral.

2. Description of the Related Art

In general, a printing apparatus or a digital multi-function peripheral (MFP) has a standby mode (standby state or ready state) and an energy saving mode (energy saving state) and has a function of changing to the other state under predetermined conditions. The standby state is a state where the printing apparatus or the digital multi-function peripheral is capable of immediately starting up a printing processing upon reception of print data. The energy saving state is a state where the power consumption is saved in comparison with in the standby state. For example, the transition from the ready state to the energy saving state occurs in the event that the ready state has continued for a longer time period than a pre-determined time period. In many cases, the time period before the transition to the energy saving mode is set to be considerably short. Accordingly, when a user intends to output print data, the printing apparatus has been changed to the energy saving mode in many cases. In order to cause the printing apparatus which has been changed to the energy saving mode to start printing processing, it is necessary to change from the energy saving mode to the ready state, which requires a certain time period. For example, an electrophotographic printing apparatus or an MFP requires 30 seconds to change to the ready state from the energy saving mode. During this time period, electricity is supplied to the fixing section in order to raise the temperature at the fixing section to a predetermined temperature, and initial operations required for the mechanism or electrophotographic processing are performed.

Japanese Unexamined Patent Application No. 10-233907 discloses a facsimile apparatus which is usually set to an energy saving mode and stores received fax data in a memory and comprehensively prints and outputs the fax data stored in the memory at time designated by a user or outputs it according to whether or not the remaining memory capacity has reached a specified capacity, thereby saving the consumed power.

If the time interval between successive printing processes is shorter or significantly longer than the waiting time before the transition of the printing apparatus to the energy saving mode, it is possible to attain energy saving while maintaining the usability for users. However, when the time interval between printing processes is compatible with the waiting time before the transition to the energy saving mode, if the printing apparatus is restored from the energy saving mode every time printing processing is performed, this will require a longer time period for restoring it to the ready state. On the other hand, the restoration to the ready state, printing processing, the transition to the energy saving mode and the restoration to the ready state are successively repeated, which prevents an energy saving effect to be attained.

To cope therewith, there has been suggested a method for changing the setting of the waiting time before the transition to the energy saving mode, depending on to the usage. However, the intervals between printing processes are variable and, therefore, it is not necessarily easy to find a proper set value. Further, if the usage is variable depending on the time slot in a day, the day and the season, changing the setting for each time slot, each day and each season is a burdensome operation for the user.

On the other hand, some printing processes require immediate output while other printing processes only require collective pick up of printout at a convenient time, and these printing processes are mixed. However, conventional printing apparatuses have processed print data required to be processed in the order of reception.

SUMMARY OF THE INVENTION

The present invention was made in view of the aforementioned circumstances and aims at providing a printing apparatus capable of holding, therein, print data which is not required to be immediately output, in the event of the occurrence of a request for printing processing, and comprehensively outputting the print data, thereby offering an energy saving effect without degrading the usability for users.

The present invention provides a printing apparatus having a standby mode and an energy saving mode, the standby mode being capable of receiving data to be printed and of starting printing processing for the received data without requiring warming-up and the energy saving mode being capable of receiving the data and of starting the printing processing for the received data after warming-up, the printing apparatus including: a print data receiving section for receiving print data from outside as the data to be printed, the print data being provided with a degree of urgency; a printing control section for changing modes between the standby mode and the energy saving mode for receiving the data and for performing control of the printing processing for the received data; and a printing section for executing the printing processing; wherein, upon the reception of the print data in the energy saving mode, the printing control section changes the mode to the standby mode for starting the printing processing for the received print data or keeps the energy saving mode for suspending the printing processing for the received print data based on the degree of urgency provided with the received print data.

Since the printing control section changes the mode from the energy saving mode to the standby mode for starting the printing processing upon receiving the print data or keeps the energy saving mode for suspending the printing processing based on the degree of urgency provided with the received print data, the printing apparatus of the present invention enables simultaneously outputting print data having a low degree of urgency in the event of a predetermined condition. This can reduce the number of times the printing apparatus is restored to the standby state in comparison with the case of restoring it to the standby state every time print data is received. Namely, this enables realization of a printing apparatus capable of offering a higher energy saving effect. Furthermore, the printing apparatus prints print data having a higher degree of urgency upon reception of the print data, thereby preventing the degradation of the usability for users.

In this case, print data may include printing conditions such as conditions set by a user, such as the paper size and the destination of outputting, as well as image data to be printed.

While the degree of urgency may be set together with other printing conditions by the user every time print data is created, the present invention is not limited thereto and, for example, a degree of urgency may be set in advance for each user ID and a host may add a degree of urgency to print data according to the ID of the user who logged in. Alternatively, the host may set in advance the degrees of urgency for certain applications and the host may add a degree of urgency to print data according to the application.

The energy saving state includes all states where the power consumption of the printing apparatus is smaller than in the standby state. The printing apparatus may have plural energy saving states having different aspects.

The printing apparatus may function as a multi-function peripheral and, in this case, the print data receiving section may receive copy data and fax-received data, as well as print data from the host. Also, in addition, the printing apparatus may receive data stored in a recording medium such as a hard disk drive or a memory card, without through the host.

The printing apparatus of the present invention may further include: a data storage section for holding the received data temporally; and a holding-time monitoring section for measuring an elapsed time from the reception of the data; wherein the print data may be further provided with information about a designated holding time for designating a holding time after the reception of the print data, when the print data being provided with a first degree of urgency is received in the energy saving mode, the printing control section may change the mode to the standby mode for starting the printing processing for the print data, when the print data being provided with a second degree of urgency is received in the energy saving mode, the printing control section may keep the energy saving mode, may perform control of holding the print data in the data storage section and, after the designated holding time elapses, may perform control of the warming-up and of the succeeding printing processing for the held print data, and when the print data being provided with a third degree of urgency is received in the energy saving mode, the printing control section may keep the energy saving mode, may perform control of holding the print data in the data storage section and, upon reception of print data having the first or second degree of urgency thereafter, may perform control of the warming-up and of succeeding printing processing for the held print data along with the received print data having the first or second degree of urgency. In this case, print data having the second degree of urgency is printed at least before the elapse of a designated holding time which is set, which can prevent the occurrence of an accident that printing is held for a time period longer than the user expected. Also, the printing control section may perform control for causing print data having the second degree of urgency to be printed in the event that other print data is intended to be printed, as the aforementioned predetermined condition.

The printing apparatus of the present invention may further include an image data acquiring section for acquiring image data by reading an image on an original and for sending the acquired image data to the printing section as the data to be printed; wherein when the print data having a third degree of urgency is held in the data storage section and when the image data is acquired thereafter, the printing control section may perform control of the printing processing for the held print data along with the acquired image data.

In this case, image data acquired by the image data acquiring section may be, for example, image data for copying read by a scanner or fax-received data received by a facsimile. This enables printing print data stored in the print data storage section, in performing printing processing for copying.

The holding-time monitoring section may monitor the elapsed time from the reception of the print data having the third degree of urgency; and the printing control section may perform control of printing processing of the held print data when the elapsed time exceeds a predetermined maximum holding time. In this case, print data having the third degree of urgency is printed after the maximum holding time has elapsed at the latest, which can prevent the occurrence of an accident that print data stored in the print data storage section is left unprinted.

Moreover, the printing apparatus may further include a degree of urgency setting section for pre-setting any one of the first, second and third degrees of urgency as the degree of urgency of image data acquired by the image data acquiring section; wherein, when the image data acquiring section acquires image data in the energy saving mode and the first degree of urgency is set as the degree of urgency for the acquired image data, the printing control section may change the mode to the standby mode for starting the printing processing of the image data, when the image data acquiring section acquires image data in the energy saving mode and the second degree of urgency is set for the acquired image data, the printing control section may keep the energy saving mode, may perform control of holding the image data in the data storage section and, after a predetermined holding time elapses from the reception of the image data, may perform control of the warming-up and of the succeeding printing processing for the acquired image data along with held print data, if there is any, and when the image data acquiring section acquires image data in the energy saving mode and the third degree of urgency is set for the acquired image data, the printing control section may keep the energy saving mode, may perform control of holding the image data in the data storage section and, upon reception of print data having the first or second degree of urgency or image data having the first or second degree of urgency thereafter, may perform control for of the warming-up and of the printing for the held image data and for held print data, if there is any, along with the received print data or the received image data having the first or second degree of urgency. In this case, it is possible to perform control for image data acquired by the image data acquiring section, according to the setting of the degree of urgency, which can realize a printing apparatus capable of offering a higher energy saving effect.

In the printing apparatus of the present invention, the printing control section may perform control of the warming-up and of succeeding printing processing for the held print data when free space of the print data storage section becomes smaller than a predetermined capacity. This can prevent the occurrence of an accident that the print data storage section has an insufficient free space, making it impossible to receive print data.

When the print data receiving section receives a plurality of print data, the printing control section may perform control of printing sequence for the received print data in such a manner that the received print data are printed out in the order of the first, second and third degrees of urgency. In this way, print data is printed in the order of the degree of urgency, which can prevent an occurrence of an accident that printing of data having a higher degree of urgency is postponed and eventually the data cannot be printed due to paper-out.

Further, when the printing control section performs control of printing processing for the held print data in the data storage section along with the subsequently received print data having the first or second degree of urgency, the printing control section may perform control of printing sequence in such a manner that the received print data having the first or second degree of urgency is printed out firstly. This enables outputting, first, print data having a higher degree of urgency and print data which is expected, by a user, to be immediately printed and the outputting of which is waited by the user near the printing apparatus, which can ensure the usability for users.

When the print data receiving section receives a plurality of print data which has the same degree of urgency with each other, the printing control section may perform control of printing sequence for the received print data in such a manner that the received print data are printed out in the order of reception of each print data. In this case, the user can easily recognize the order of printing, which is convenient for the user.

BRIEF DESCRIPTION OF THE DRAWINGS

FIG. 8 is a block diagram illustrating an exemplary electrical structure of the printing apparatus according to the present invention.

DESCRIPTION OF THE PREFERRED EMBODIMENTS

Hereinafter, the present invention will be described in more detail, with reference to the drawings. The present invention will be understood more clearly from the following detailed description. Further, the following description is not intended to restrict the present invention.

Figure 7:
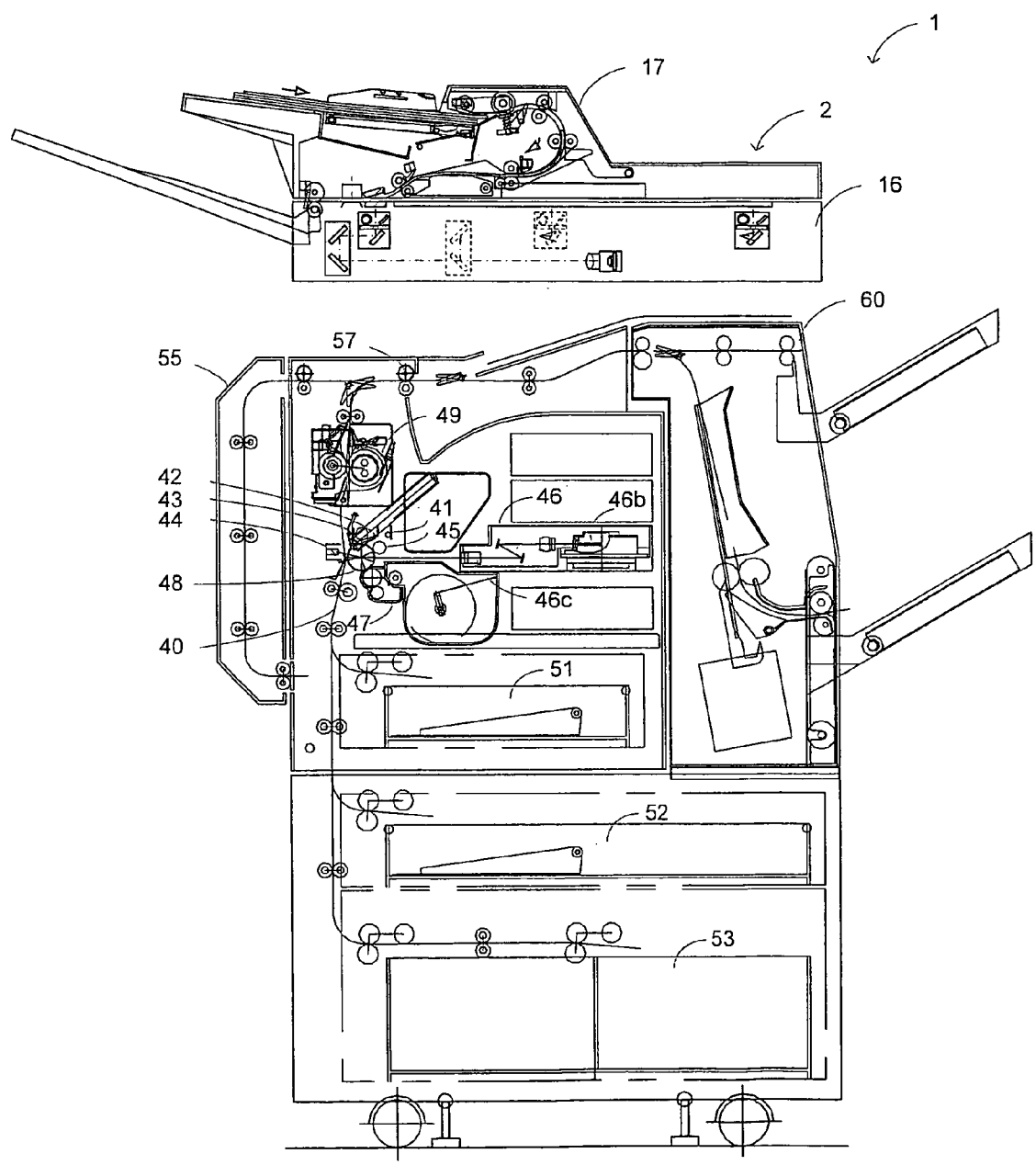
FIG. 7 is a cross-sectional view illustrating an exemplary mechanical structure of the printing apparatus according to the present invention.

FIG. 7 is a cross-sectional view illustrating an exemplary mechanical structure of a printing apparatus according to the present invention. As illustrated in FIG. 7, the printing apparatus 1 includes a transfer system for sheets which are recording materials for forming images thereon, a laser writing unit (LSU) 46 and an electrophotographic processing section including a photoconductor drum 48 for forming images. The laser writing unit 46 includes a semiconductor laser light source (not shown) for emitting laser light according to image data read from an image memory (not shown), a polygon mirror 46b which polarizes the laser light at a constant angular velocity, and an f-θ lens 46c which corrects the laser light which has been polarized at a constant angular velocity such that it is polarized at the surface of the photoconductor drum 48, at a constant angular velocity.

The aforementioned electrophotographic processing section includes, around the photoconductor drum 48 which is well known, an electrostatic charger 45, a developing unit 47, a transferring unit 44, a detaching device 43, a cleaning unit 42, and a discharger 41.

On the other hand, the sheet transfer system includes a sheet transfer section 40, sheet trays 51, 52 and 53, a fixing unit 49, and a sheet re-supply unit 55. The sheet transfer section 40 transfers sheets to the electrophotographic processing section which performs the aforementioned image formation, particularly to the transferring position at which the transferring unit 44 is placed. The sheet trays 51, 52 and 53 supply sheets to the sheet transfer section 40. The fixing unit 49 fixes images, particularly toner images, which have been formed on the sheets after transferring. The sheet re-supply unit 55 supplies sheets thereto for forming images, again, on the back surfaces of the sheets, after the fixing.

Further, downstream of the fixing unit 49, there is placed a finisher 60 which receives sheets on which images have been formed, stacks the sheets while offsetting them from one another and then performs, thereon, predetermined finishing such as stapling, punching.

Image data read from the image memory 115 in FIG. 8 is directed to the laser writing unit 46. The laser writing unit 46 includes a laser light source. The aforementioned image data is used for modulating the laser light emitted from the laser light source. The surface of the photoconductor drum 48 is scanned with the modulated laser light, thereby forming an electrostatic latent image thereon. The electrostatic latent image formed thereon corresponds to the aforementioned image data. The electrostatic latent image is converted into a visible image with toners supplied from the developing unit 47 and, therefore, is converted into a toner image. The toner image is transferred and fixed to the surface of a sheet which is fed from any one of the sheet trays 51, 52 and 53.

Further, the printing apparatus 1 includes a scanner 2 for reading images on documents and operates as a multi-function peripheral. The scanner 2 is constituted by a document feeder 17 for transferring documents and a scanning optical system 16 for scanning documents for reading them. Further, the printing apparatus 1 includes a fax board, not illustrated, for sending and receiving fax data to and from external facsimiles through public lines.

The sheet on which the image has been formed as described above is transferred to the inside of the finisher 60 from the fixing unit 49 through a main-body sheet exit roller 57. The finisher performs stapling processing with a stapler, not illustrated, or punching processing with a puncher, not illustrated, according to settings.

There has been described the mechanical structure of the printing apparatus 1. Next, the electric structure of the printing apparatus 1 will be described.

FIG. 8 is a block diagram illustrating an exemplary electric structure of the printing apparatus according to the present invention. As illustrated in FIG. 8, the printing apparatus 1 includes a CCD device 101 and an A/D converter 103 for reading images on documents, in order to function as a digital multi-function peripheral (MFP). Further, the printing apparatus 1 includes a fax board 131 for sending and receiving fax data to and from external facsimiles through public lines. Further, the printing apparatus 1 includes an I/F PWB 107 for acquiring print data from an external host PC 105 by being connected to an IEEE1284 and an USB, and a network I/F 111 for acquiring print data from an external host PC 109 through a network. Further, the printing apparatus 1 includes an image processing ASIC 113 for processing image data which has been read by the CCD device 101 and then is converted into digital data by the A/D converter 103. The image processing ASIC 113 performs image processing on print data acquired from the host PC 109 or read by the image CCD device 101 and then transfers the image data to an LSU 46 or stores it in an image memory 115. The image memory is constituted by an SDRAM and an HDD for storing print data or image data. The printing apparatus 1 further includes and an image conversion ASIC/CPU 117 which performs conversion processing such as rotating processing on the acquired print data or image data. Further, the printing apparatus 1 includes an image conversion memory 129 which provides a work area for use in image conversion processing. Further, the printing apparatus 1 includes an operation panel 133 which informs a user the state of the printing apparatus 1 and allow the user to input instructions. In addition, the printing apparatus 1 includes a main control CPU 119 for controlling the operations of the aforementioned respective blocks for controlling the operation of the entire printing apparatus 1, an EEPROM 123 for holding backup data, a flash ROM 125 for storing a program designating the procedure of processing to be executed by the main control CPU 119, and a SRAM 127 for providing a work area for the main control CPU 119. Further, the printing apparatus 1 includes an LSU 46 for receiving data transferred from the image processing ASIC 113 and forming, on the surface of the photoconductor drum 48, electrostatic latent images corresponding to images.

Print data created in the host PC 109 is transferred to the image processing ASIC 113 through the network I/F 111. The main control CPU 119 stores the received print data in an SDRAM in the image memory 115. Also, in cases where the print data has a low degree of urgency, the print data is stored in the HDD of the image memory 115 and will be subjected to printing processing later. Print data having a high degree of urgency is expanded into raster image data in the SDRAM of the image memory 115 by the main control CPU and then is subjected to rotating processing by the image conversion ASIC/CPU 117 as required. Then, the print data which has been expanded into raster image data is transferred to the LSU 46 and then is written onto the surface of the photoconductor drum 48 of FIG. 7 by a semiconductor laser light source, not illustrated.

There has been described the electric structure of the printing apparatus 1. Next, the functional structure of the printing apparatus 1 will be described.

Figure 1:
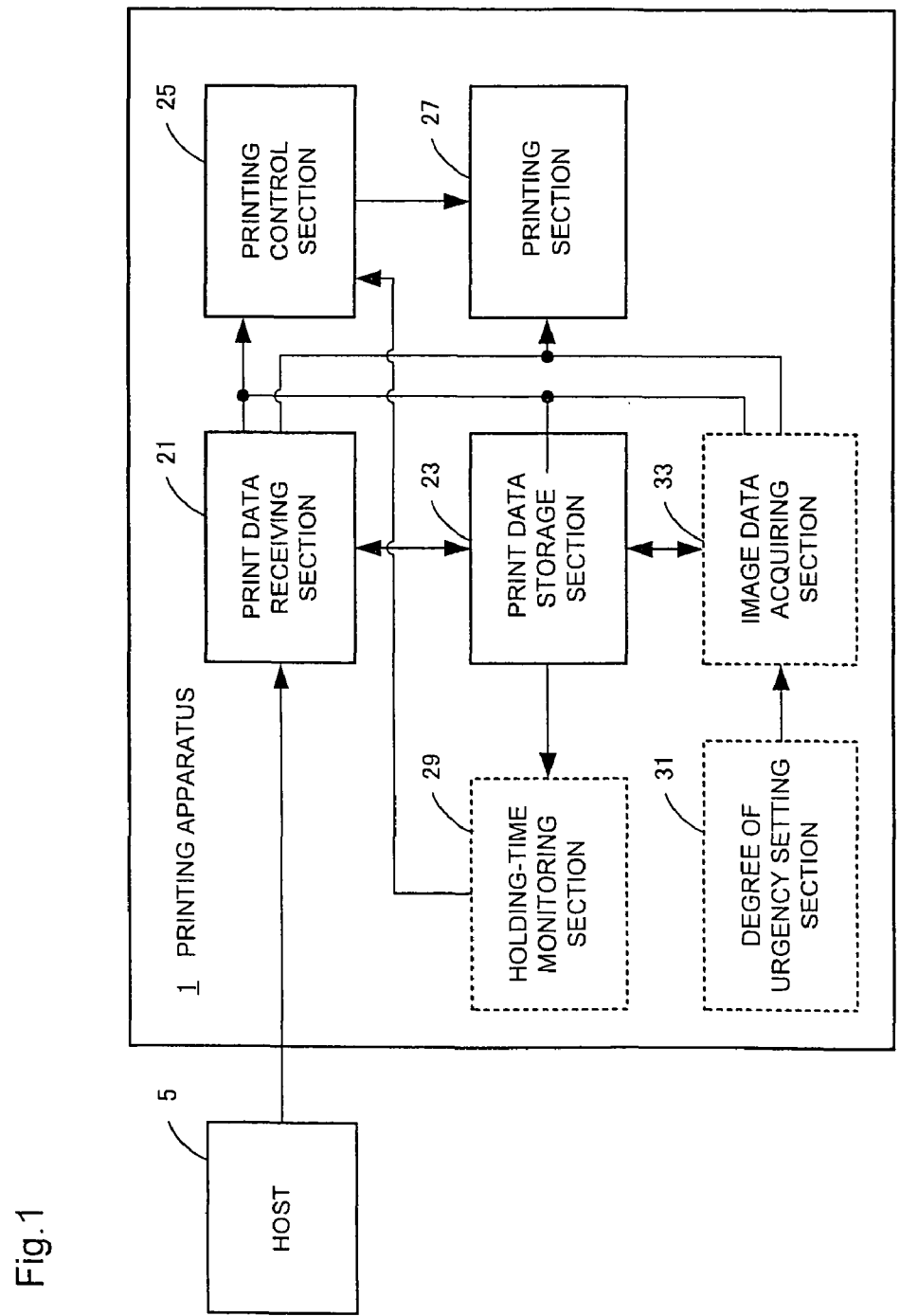
FIG. 1 is a block diagram illustrating an exemplary functional structure of a printing apparatus according to the present invention.

FIG. 1 is a block diagram illustrating an exemplary functional structure of the printing apparatus according to the present invention. As illustrated in FIG. 1, the printing apparatus 1 receives print data from a host 5. The print data includes the setting of a degree of urgency in the host 5. The print data received by a print data receiving section 21 is transferred to a print data storage section 23 and is stored therein or transferred to a printing section 27 and is printed therefrom. A printing control section 25 controls these processes on the print data. The fact that the print data receiving section 21 has received the print data, the degree of urgency included in the print data and other information about printing are sent to the printing control section 25. The printing control section 25 controls processing on this print data, based on the degree of urgency and the other information received from the print receiving section.

In addition, the printing apparatus 1 may include a holding-time monitoring section 29, an image data acquiring section 33 and a degree of urgency setting section 31, although these are not essential components. The holding-time monitoring section 29 includes timers for measuring the time which has elapsed since print data was stored in the print data storage section. The image data acquiring section 33 acquires image data which is data to be subjected to printing processing, other than print data from the host 5, for example, print data for copying and faxed print data. The degree of urgency setting section 31 sets the degree of urgency of the image data. The blocks which are inessential components are illustrated by dot lines, in order to indicate that.

In FIG. 1, the print data receiving section 21 corresponds to an I/F board 107 in FIG. 8 and the print data storage section corresponds to the HDD included in the image memory 115 in FIG. 8. Further, the main control CPU 119 in FIG. 8 executes a part of the program stored in the flash ROM 125 to realize the printing control section 25. The printing section 27 corresponds to the LSU 46 in FIG. 8 and also corresponds to the mechanism illustrated as the printing apparatus 1 in FIG. 7. A combination of a timer circuit which is not illustrated and the main control CPU 119 in FIG. 8 which executes another part of the program stored in the flash ROM 125 realizes the holding-time monitoring section 29. A combination of the operation panel 133 in FIG. 8 and the CPU 119 which further executes another part of the program stored in the flash ROM 125 for controlling the operation panel 133 realizes the degree of urgency setting section 31. Further, the print data acquiring section 33 corresponds to the CCD device 101 and the A/D converter for acquiring document images, and the FAX board 131 for acquiring FAX-received data in FIG. 8. Further, the print data acquiring section 33 corresponds to the scanner 2 for reading document images in FIG. 7.

There has been described the functional structure of the printing apparatus 1. Next, the procedure of processing which is executed by the main control CPU 119 in the printing apparatus 1 will be described.

Figure 2:
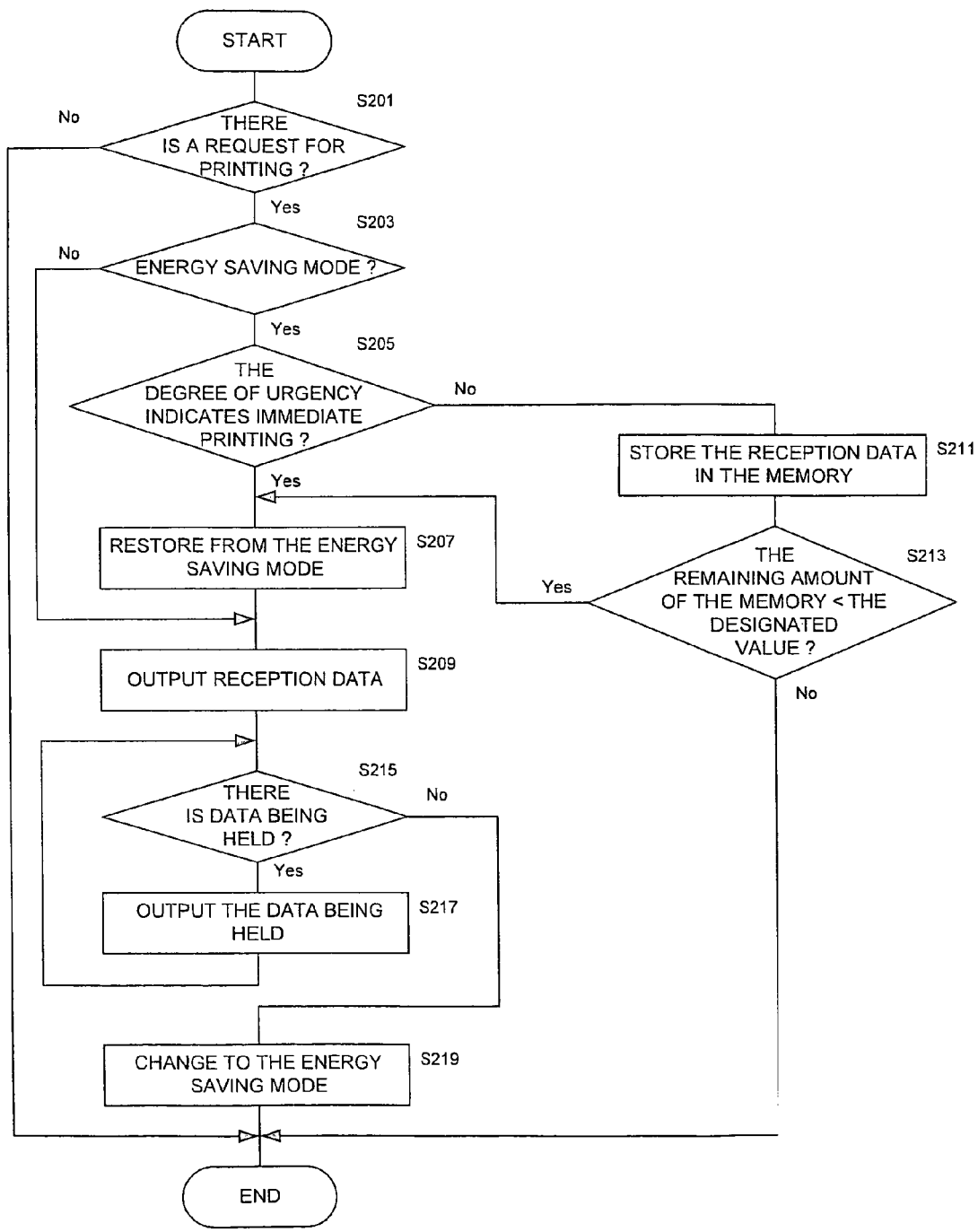
FIG. 2 is a flow chart illustrating exemplary processing which is executed by the printing control section 25 in the printing apparatus according to the present invention (a first embodiment).

FIG. 2 is a flow chart illustrating exemplary processing which is executed by the main control CPU 119. The flow chart of FIG. 2 illustrates the procedure of processing which is executed when print data is transferred from the host 5 in FIG. 1 to the printing apparatus 1 and the print data receiving section 21 makes a request for printing processing to the printing control section 25, in response to the reception of the print data. In this case, the main control CPU 119 executes the following processing, as the printing control section 25.

First, if the printing control section 25 determines that the print data receiving section 21 has made a request for printing (step S201), the printing control section 25 determines whether or not the printing apparatus 1 is in an energy saving mode or in a ready state (step S203). In the case of the ready state, the routine proceeds to a step S209 where the received print data is output. On the other hand, in the case of the energy saving mode, the printing control section 25 checks the degree of urgency included in the received print data (step S205).

If the degree of urgency included in the print data indicates that the print data should be output without holding printing thereof, the printing control section 25 restores the printing apparatus 1 to the ready state from the energy saving mode (step S207) and causes the printing section 27 to print the received print data (step S209). Further, the printing control section 25 determines whether or not there is stored other print data the printing of which is being held, in the print data storage section 23 (step S215). Then, the printing control section 25 causes all print data being held to be printed (step S217). After all the print data which has been held is output or if there is stored no print data being held in the print data storage section 23, the routine proceeds to a step S219 where the printing apparatus 1 is shifted to the energy saving mode and the processing ends.

On the other hand, if it is determined at the aforementioned step S205 that the degree of urgency of the received print data indicates that the print data is not required to be immediately printed and output, the routine proceeds to a step S211 where the received print data is stored in the print data storage section 23 and printing thereof is held.

In this case, if the free space of the print data storage section 23 is equal to or greater than a predetermined capacity (step S213, No), the processing ends. However, if the free space is smaller than the predetermined capacity (step S213, Yes), the stored print data is output in order to secure a storage capacity. In this case, the routine proceeds to the step S207 where the printing apparatus 1 is restored from the energy saving mode and all the print data is output.

Second Embodiment

Figure 3:
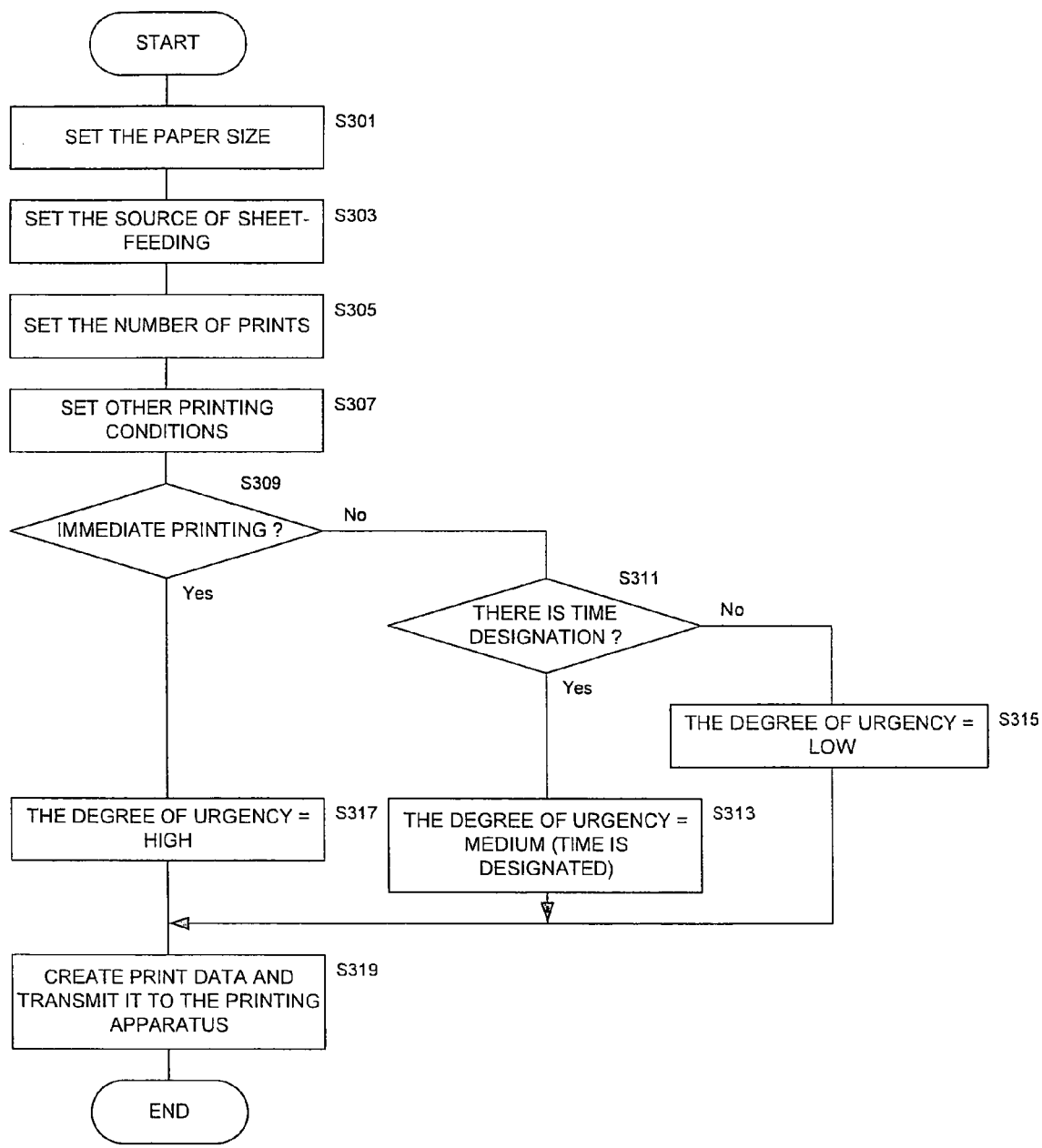
FIG. 3 is a flow chart illustrating exemplary processing for causing the host 5 in FIG. 1 to add a degree of urgency to print data (a second embodiment).

FIG. 3 is a flow chart illustrating exemplary processing for causing the host 5 to add a degree of urgency to print data. The flow chart of FIG. 2 illustrates a case of causing a user to set printing conditions including the setting of the degree of urgency, in creating print data. In order to cause the user to set printing conditions, the host 5 causes a display screen which is not illustrated to display thereon a printing-condition setting screen and causes the user to make settings of printing conditions using a keyboard and a mouse which are not illustrated. In the processing for setting printing conditions, the host 5 causes the user to make the setting of the paper size (step S301), the setting of the destination of sheet feeding (step S303), the setting of the number of prints (step S305) and the settings of other printing conditions (step S307). Further, the host 5 causes the user to make the setting of whether or not the created print data should be immediately printed (step S309) and, if the user makes the setting of holding the printing of the print data, not immediately printing it, the host 5 causes the user to select designating the duration of time before printing or not designating it (step S311). If the user selects designating the duration of time, the host 5 makes the setting of adding, to the print data, "medium" as the degree of urgency and the duration of time designated by the user as the designated holding time (step S313) and, then, the routine proceeds to a step S319. On the other hand, if the user does not designate the duration of time, the host 5 makes the setting of adding "low" as the degree of urgency to the print data (step S315) and, then, the routine proceeds to the step S319.

On the other hand, if it is determined at the aforementioned step S309 that the user sets immediate printing, the host 5 makes the setting of adding "high" as the degree of urgency to the print data (step S317). After determining the setting of the degree of urgency as described above, the host 5 creates print data, then adds the conditions set at the aforementioned steps S301 to 307 and the degree of urgency to the created print data and then transmits the print data to the printing apparatus 1 (step S319).

Third Embodiment

Figure 4:
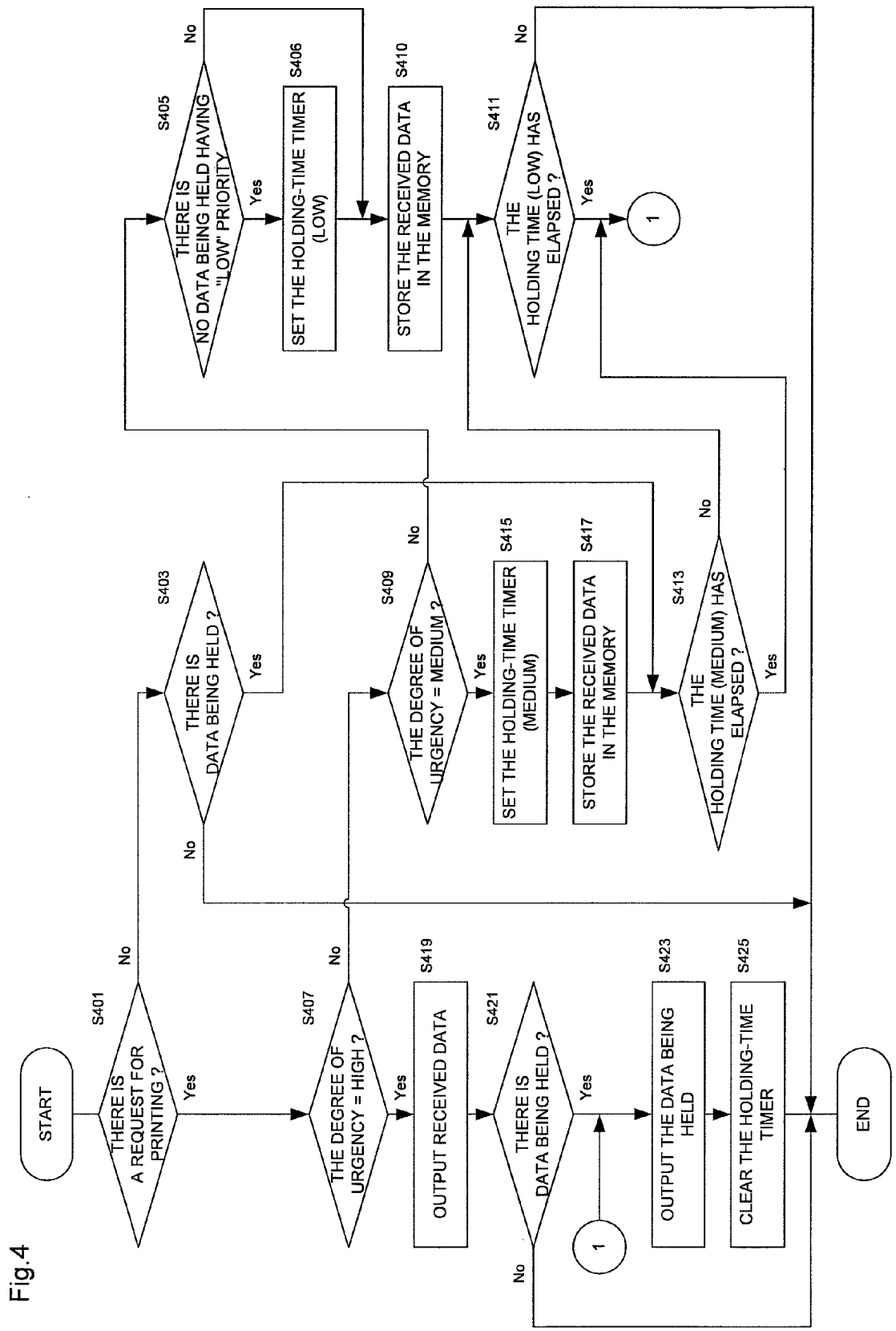
FIG. 4 is a flow chart illustrating another exemplary processing which is executed by the printing control section 25 in the printing apparatus according to the present invention (a third embodiment).

FIG. 4 is a flow chart illustrating exemplary processing which is executed by the main CPU 119. The flow chart of FIG. 4 illustrates the procedure of processing for causing the printing control section 25 to determine whether or not there is received print data or print data stored in the print data storage section 23 after the elapse of a predetermined time. Further, the flow chart illustrates the procedure of processing which is executed when the degree of urgency of received print data indicates that printing of the print data should be held. Further, in the present embodiment, the printing apparatus 1 includes the holding-time monitoring section 29. The main control CPU 119 executes the following processing as the printing control section 25.

First, the printing control section 25 determines whether or not the print data receiving section 21 has made a request for printing (step S401). If the print data receiving section 21 has received print data and has made a request for printing processing, the printing control section 25 checks the degree of urgency included in the received print data. In the present embodiment, it is assumed that any one of "high", "medium" and "low" degrees of urgency is set therein. If the degree of urgency of the print data is "high" (step S407), the printing control section 25 causes the printing section 27 to print the print data without holding the printing thereof (step S419). Further, the printing control section 25 determines whether or not there is stored print data the printing of which is being held, in the print data storage section 23 (step S421). If there is no print data being held, the processing ends, while if there is print data being held, the print data being held is printed (step S423), and the holding-time monitoring section 29 clears all the timers which measure the holding times of these print data (step S425).

On the other hand, if it is determined at the aforementioned step S407 that the degree of urgency of the received print data is "medium" (step S409), the printing control section 25 assigns one of the time-measurement timers in the holding-time monitoring section 29 to the received print data and sets the assigned time-measurement timer to the designated holding time added to the print data (step S415). Then, the printing control section 25 stores the print data in the print data storage section 23 (step S417). Thereafter, the routine proceeds to a step S413 where it is determined whether or not there is a time-measurement timer which has exceeded the designated holding time. If there is a time-measurement timer which has exceeded the designated holding time, the routine proceeds to a step S423 where the print data stored in the print data storage section 23 which is assigned to this timer is output. On the other hand, if there is no timer which has exceeded the designated holding time, the routine proceeds to a step S411 which will be described later.

If it is determined at the aforementioned step S409 that the degree of urgency of the received print data is "low", the routine proceeds to a step S405 where it is determined whether or not there is stored, in the print data storage section 23, other print data having a degree of urgency of "low". If there is stored no other print data having a degree of urgency of "low", a time-measurement timer for print data having a degree of urgency of "low" is assigned to the received print data and the assigned timer is set to a predetermined maximum holding time, for the print data having the "low" degree of urgency to be first stored (step S406). Then, the routine proceeds to a next step S410. On the other hand, if there has been already stored print data having a degree of urgency of "low", the routine proceeds to the step S410 where the received print data is stored in the print data storage section 23, without setting a timer.

Next, the routine proceeds to a step S411 where the printing control section 25 determines whether or not the timer for time measurement for the print data having a degree of urgency of "low" has exceeded the maximum holding time and, thus, the time has been up. If the maximum holding time has not been exceeded, the processing ends, while if the maximum holding time has been exceeded the routine proceeds to a step S423 where all print data having a degree of urgency of "low" stored in the print data storage section 23 is printed.

Also, if it is determined at the aforementioned step S401 that there is no request for printing processing, the routine proceeds to a step S403 where the printing control section 25 determines whether or not there is stored print data the printing of which is being held, in the print data storage section 23. If there is no print data being held, the processing ends, while if there is print data being held, the routine proceeds to a step S413 and, if there is print data having a degree of urgency of "medium" which has exceeded the designated holding time or print data having a degree of urgency of "low" which has exceeded the maximum holding time, the printing section 27 is caused to print the print data.

Fourth Embodiment

Figure 5:
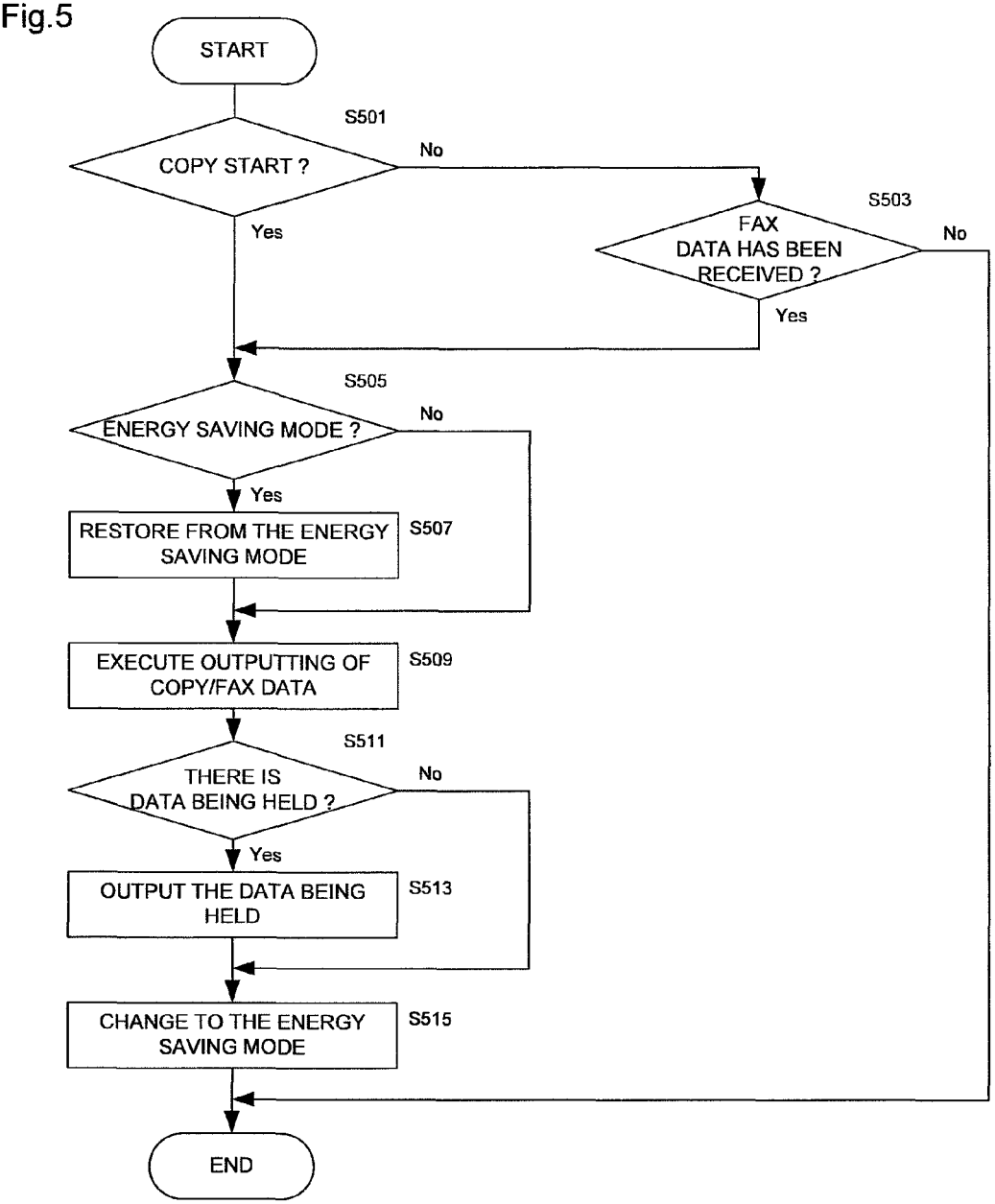
FIG. 5 is a flow chart illustrating another exemplary processing which is executed by the printing control section 25 in the printing apparatus according to the present invention (a fourth embodiment).

FIG. 5 is a flow chart illustrating another exemplary processing which is executed by the main control CPU 119. The flow chart of FIG. 5 illustrates the procedure of processing for causing the printing control section 25 to print held print data, along with printing of image data. The main control CPU 119 executes the following processing as the printing control section 25.

First, the printing control section 25 determines whether or not there is a request for starting copy outputting, from the image data acquiring section 33, due to the acquisition of image data for copying (step S501). If there is a request for starting copying, the routine proceeds to a step S505 where copy outputting processing is performed. On the other hand, if there is no request for starting copy outputting, the printing control section 25 determines whether or not there is a request for starting fax outputting, due to the acquisition of fax-received data (step S503). If there is no request for starting fax outputting, the processing ends, while if there is no request for starting fax outputting, the routine proceeds to the step S505 where fax outputting processing is performed.

At the step S505, the printing control section 25 determines whether the printing apparatus 1 is in an energy saving mode or a ready state. In the case of the ready state, the routine proceeds to a step S509 where the received image data is output. On the other hand, in the case of the energy saving mode, the printing control section 25 restores the printing apparatus 1 from the energy saving mode to the ready state (step S507) and causes the printing section 27 to print the received image data (step S509). Further, the printing control section 25 determines whether or not there is stored other print data the printing of which is being held, in the print data storage section 23 (step S511). Then, the printing control section 25 causes all the print data being held to be printed (step S513). After all the print data which has been held is output or if it is determined at the aforementioned step S511 that there is stored no print data being held in the print data storage section 23, the routine proceeds to a step S515 and, if a predetermined time period has elapsed at a standby state and no subsequent processing is performed and no operations are performed by the user, the printing control section 25 shifts the printing apparatus 1 to the energy saving mode (step S505) and ends the processing.

Fifth Embodiment

Figure 6:
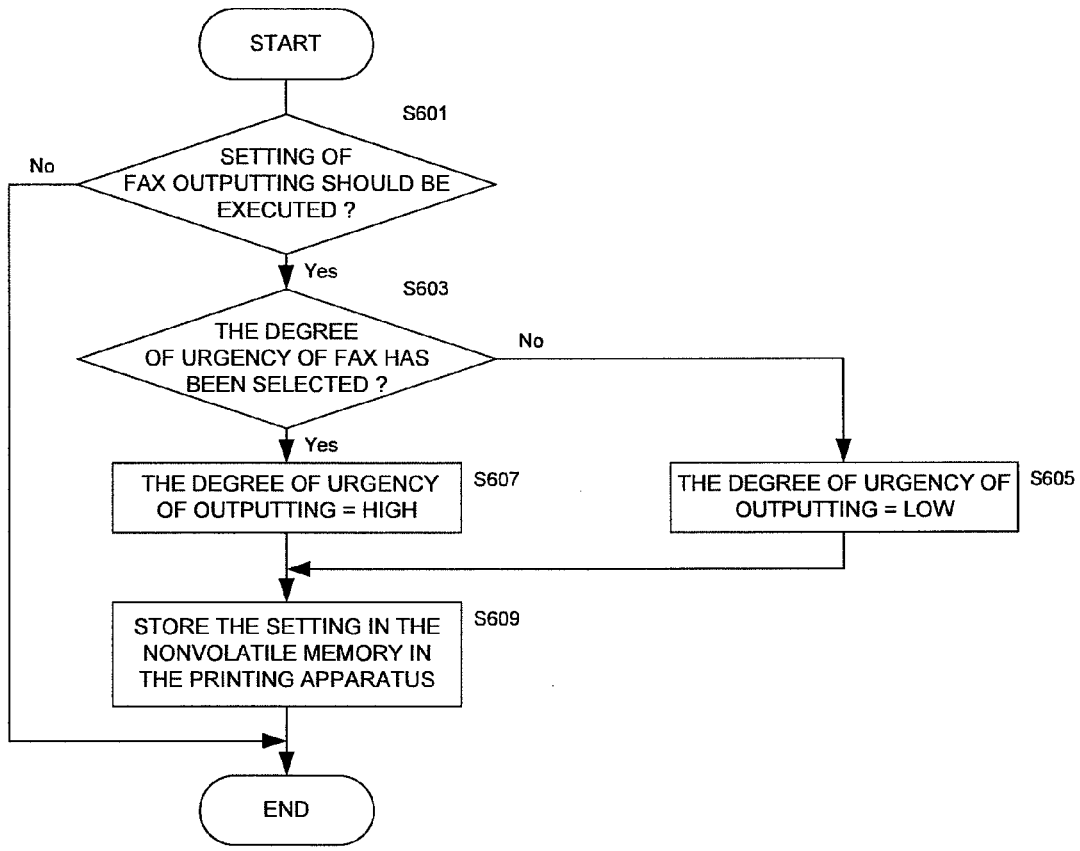
FIG. 6 is a flow chart illustrating exemplary processing which is executed by the degree of urgency setting section 31 in the printing apparatus according to the present invention (the fourth embodiment).

FIG. 6 is a flow chart illustrating another exemplary processing which is executed by the main control CPU 119. The flow chart of FIG. 6 illustrates the procedure of processing for causing the degree of urgency setting section 31 to set the degree of urgency of fax-received data, according to operations performed by a user, in the case where the printing apparatus includes the degree of urgency setting section 31.

The main control CPU 119 executes the following processing as the degree of urgency setting section 31.

The degree of urgency setting section 31 starts the processing, when the user selects a degree of urgency setting operation screen which is provided on the operation panel 133 of FIG. 8. First, the degree of urgency setting section 31 determines whether or not the user has selected the setting of the degree of urgency of fax-received data on the operation screen (step S601). If the user has not selected it, the processing ends, while if he or she has selected the setting of the degree of urgency, the degree of urgency setting section 31 holds and stores the degree of urgency set by the user. In the present embodiment, two types of degrees of urgency, "high" and "low", can be set on the aforementioned operation screen, and the processes associated with the respective degrees of urgency of print data which have been described in the second embodiment are performed. The degree of urgency setting section 31 determines whether the degree of urgency set on the aforementioned operation screen by the user is "high" or "low" (step S603). If the "high" degree of urgency is set, a value associated with the "high" degree of urgency is stored as the degree of urgency of outputting of the fax-received data, in a predetermined area of the EEPROM 123 (steps S607 and S609). On the other hand, if the "low" degree of urgency is set, a value associated with the "low" degree of urgency is stored in the aforementioned area of the EEPROM 123 (steps S605 and S609).

In this case, the setting of the degree of urgency is used in processing for causing the printing control section 25 to print image data, in response to a request for printing from the image data acquiring section 33 when the image data acquiring section 33 acquires fax-received data. This processing corresponds to the print data printing processing described in the third embodiment. While the printing control section 25 determines the procedure of processing based on the degree of urgency included in print data in the third embodiment, in the present embodiment the printing control section 25 refers to the degree of urgency stored in the predetermined area at the aforementioned step S609 and processes fax-received data. Namely, if the degree of urgency is "high", the printing control section 25 outputs the fax-received data without holding the printing thereof. If the degree of urgency of "low", the acquired fax-received data is stored in the print data storage section and is output along with printing of print data or image data having higher priority. The printing control section 25 processes all the fax-received data similarly to print data having set priority.

It is apparent that various modifications can be made as well as the aforementioned embodiments. It is intended that the features and the claims of the present invention encompass any such modifications. It is apparent to those skilled in the art that the claims of the present invention are intended to encompass such modifications.

What is claimed is:

1. A printing apparatus being connected to a host and having a standby mode and an energy saving mode, the standby mode being capable of receiving print data and of starting printing processing for the received print data without requiring warming-up and the energy saving mode being capable of receiving the print data and of starting the printing processing for the received print data after warming-up, the printing apparatus comprising:

a print data receiving section for receiving print data from the host, the print data being provided with a first, second or third degree of urgency and in case of the second degree of urgency, the print data being further provided with a designated holding time for designating a holding time after the reception of the print data;

a printing control section for changing modes between the standby mode and the energy saving mode for receiving the print data and for performing control of the printing processing for the received print data; and a printing section for executing the printing processing;

wherein, upon the reception of the print data in the energy saving mode, the printing control section changes the mode to the standby mode for starting the printing processing for the received print data or maintains the energy saving mode for suspending the printing processing for the received print data based on the degree of urgency provided with the received print data;

a data storage section for holding the received print data temporally; and a holding-time monitoring section for measuring an elapsed time from the reception of the print data;

wherein when the print data being provided with a first degree of urgency is received in the energy saving mode, the printing control section changes the mode to the standby mode for starting the printing processing for the print data, when the print data being provided with a second degree of urgency is received together with the designated holding time in the energy saving mode, the printing control section keeps the energy saving mode, performs control of holding the print data in the data storage section and, after the designated holding time elapses, performs control of the warming-up and of the succeeding printing processing for the held print data, and when the print data being provided with a third degree of urgency is received in the energy saving mode, the printing control section keeps the energy saving mode, performs control of holding the print data in the data storage section and, upon reception of print data having the first or second degree of urgency thereafter, performs control of the warming-up and of succeeding printing processing for the held print data along with the received print data having the first or second degree of urgency.

2. The printing apparatus according to claim 1, further comprising an image data acquiring section for acquiring image data by reading an image on an original and for sending the acquired image data to the printing section as the print data;

wherein when the print data having the third degree of urgency is held in the data storage section and when the image data is acquired thereafter, the printing control section performs control of the printing processing for the held print data along with the acquired-image data.

3. The printing apparatus according to claim 1, wherein the holding-time monitoring section monitors the elapsed time from the reception of the print data having the third degree of urgency; and the printing control section performs control of printing processing of the held print data when the elapsed time exceeds a predetermined maximum holding time.

4. The printing apparatus according to claim 2, further comprising a degree of urgency setting section for pre-setting any one of the first, second and third degrees of urgency as the degree of urgency of image data acquired by the image data acquiring section;

wherein, when the image data acquiring section acquires image data in the energy saving mode and the first degree of urgency is set as the degree of urgency for the acquired image data, the printing control section changes the mode to the standby mode for starting the printing processing of the image data, when the image data acquiring section acquires image data in the energy saving mode and the second degree of urgency is set for the acquired image data, the printing control section keeps the energy saving mode, performs control of holding the image data in the data storage section and, after a predetermined holding time elapses from the reception of the image data, performs control of the warming-up and of the succeeding printing processing for the acquired image data along with held print data, if there is any, and when the image data acquiring section acquires image data in the energy saving mode and the third degree of urgency is set for the acquired image data, the printing control section keeps the energy saving mode, performs control of holding the image data in the data storage section and, upon reception of print data having the first or second degree of urgency or image data having the first or second degree of urgency thereafter, performs control for of the warming-up and of the printing for the image data held in the data storage section and for held print data, if there is any, along with the received print data or the received image data having the first or second degree of urgency.

5. The printing apparatus according to claim 1, wherein the printing control section performs control of the warming-up and of succeeding printing processing for the held print data when free space of the print data storage section becomes smaller than a predetermined capacity.

6. The printing apparatus according to claim 1, wherein when the print data receiving section receives a plurality of print data, the printing control section performs control of printing sequence for the received print data in such a manner that the received print data are printed out in the order of the first, second and third degrees of urgency.

7. The printing apparatus according to claim 1, wherein when the printing control section performs control of printing processing for the held print data in the data storage section along with the subsequently received print data having the first or second degree of urgency, the printing control section performs control of printing sequence in such a manner that the received print data having the first or second degree of urgency is printed out firstly.

8. The printing apparatus according to claim 1, wherein when the print data receiving section receives a plurality of print data which has the same degree of urgency with each other, the printing control section performs control of printing sequence for the received print data in such a manner that the received print data are printed out in the order of reception of each print data.

9. A printing system comprising a host and a printing apparatus being connected to the host and having a standby mode and an energy saving mode, the standby mode being capable of receiving print data and of starting printing processing for the received print data without requiring warming-up and the energy saving mode being capable of receiving the print data and of starting the printing processing for the received print data after warming-up, wherein the host provides a print data with a first, second or third degree of urgency according to a setting by a user and in case of the second degree of urgency, further provides with a designated holding time for designating a holding time after the reception of the print data, and the printing apparatus comprises:

a print data receiving section for receiving the print data from the host;

a printing control section for changing modes between the standby mode and the energy saving mode for receiving the print data and for performing control of the printing processing for the received print data; and a printing section for executing the printing processing;

wherein, upon the reception of the print data in the energy saving mode, the printing control section changes the mode to the standby mode for starting the printing processing for the received print data or maintains the energy saving mode for suspending the printing processing for the received print data based on the degree of urgency provided with the received print data;

a data storage section for holding the received print data temporally; and a holding-time monitoring section for measuring an elapsed time from the reception of the print data;

wherein when the print data being provided with a first degree of urgency is received in the energy saving mode, the printing control section changes the mode to the standby mode for starting the printing processing for the print data, when the print data being provided with a second degree of urgency is received together with the designated holding time in the energy saving mode, the printing control section keeps the energy saving mode, performs control of holding the print data in the data storage section and, after the designated holding time elapses, performs control of the warming-up and of the succeeding printing processing for the held print data, and when the print data being provided with a third degree of urgency is received in the energy saving mode, the printing control section keeps the energy saving mode, performs control of holding the print data in the data storage section and, upon reception of print data having the first or second degree of urgency thereafter, performs control of warming-up and of succeeding printing processing for the held print data along with the received print data having the first or second degree of urgency.

* * * * *